H. M. ENGLE.
INDICATING MEANS FOR ROLL FILMS.
APPLICATION FILED SEPT. 10, 1912.
1,064,465.
Patented June 10, 1913.
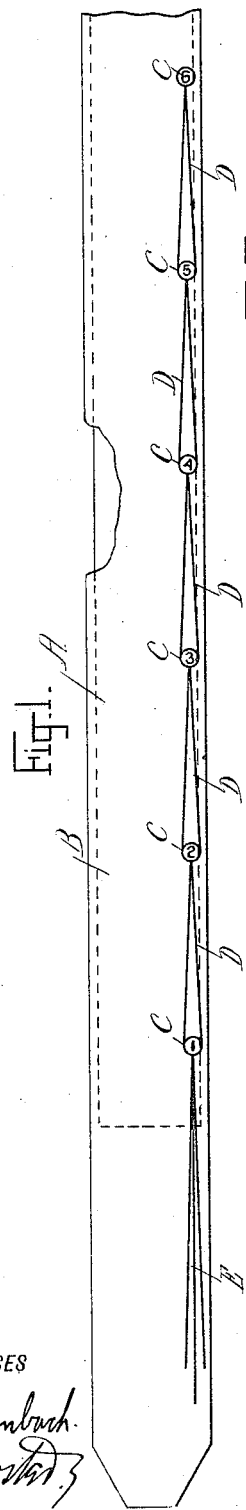
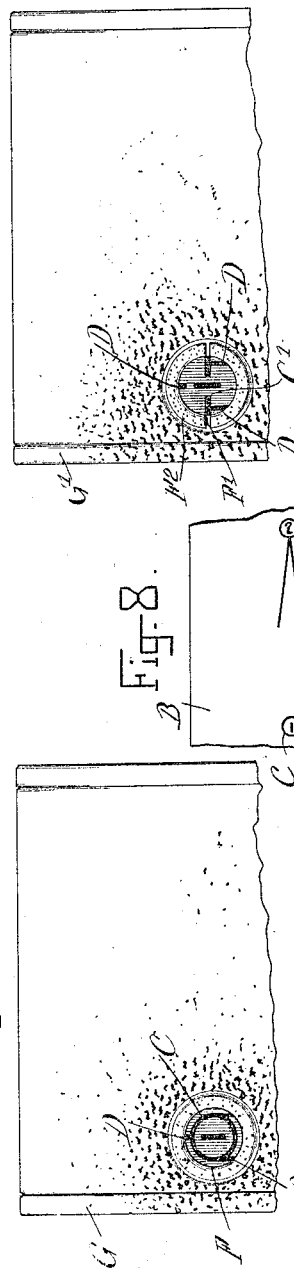
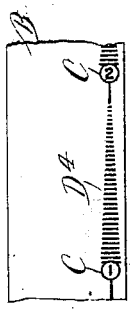
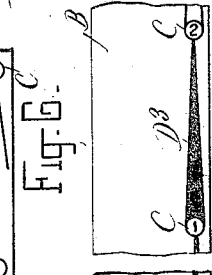
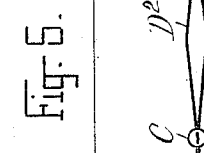
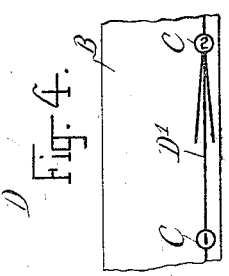
WITNESSES
INVENTOR
Horace M. Engle,
BY
ATTORNEYS

UNITED STATES PATENT OFFICE.

HORACE M. ENGLE, OF ROANOKE, VIRGINIA.

INDICATING MEANS FOR ROLL-FILMS.

1,064,465.

Specification of Letters Patent.   Patented June 10, 1913.

Application filed September 10, 1912. Serial No. 719,603.

*To all whom it may concern:*

Be it known that I, HORACE M. ENGLE, a citizen of the United States, and a resident of Roanoke, in the county of Roanoke and State of Virginia, have invented a new and Improved Indicating Means for Roll-Films, of which the following is a full, clear, and exact description.

The invention relates to photography and more particularly to flexible roll films such as are used in kodaks and similar photographic cameras.

The object of the invention is to provide a new and improved indicating means for roll films arranged to enable the user of the camera containing the roll film to observe the unwinding of the film without unduly straining the eyes, or constantly or intently looking at the camera window to prevent over-winding or under-winding of the film, and to allow of quickly winding the film thus avoiding delay in making the successive exposures.

In order to accomplish the desired result use is made of film-section or position marks arranged on the back of the protective ribbon carrying the sensitive films, the said film-section or position marks being spaced apart according to the size of the camera, and connecting marks intermediate adjacent film section or position marks and appearing like the latter at the camera window when the roll film is unwound.

A practical embodiment of the invention is represented in the accompanying drawings forming a part of this specification, in which similar characters of reference indicate corresponding parts in all the views.

Figure 1 is a plan view of a roll film with part of the protective ribbon broken out to show the sensitive film; Fig. 2 is a rear end view of a portion of a camera containing the roll film and showing the observation window and the indicating means; Fig. 3 is a similar view of a modified form of the same; and Figs. 4, 5, 6, 7 and 8 are plan views of the roll film provided with modified forms of the indicating means.

The roll film now generally used is put up in the form of a so-called "cartridge" which consists of a sensitized film and a non-actinic covering ribbon which are together tightly wound on a roll and secured thereon by a gummed band, the whole having a temporary wrapping of paper or tinfoil and a paper carton. In use, the present form of such cartridge is placed in the camera and unwound for a certain distance, whereby the extended end of the protective wrapping ribbon is removed, exposing within the camera, the sensitive film. In order that the user may know when the film is in proper position, there is usually a small mark or index, such as the representation of a hand, printed on the back of the protective covering ribbon a few inches in advance of the position for making the first exposure, and thereafter, the numbers 1, 2, 3, 4, etc. follow consecutively and indicate the position of the film for taking the succeeding exposures, all of such marks and numbers being visible successively as they pass beneath a small window in the side or back of the camera, such window being made of colored celluloid or similar other material which is sufficiently transparent to enable such marks to be seen by the operator, but which is opaque to actinic light.

While the above-described method of marking the ribbon and of viewing the marks through such window enables the user of the camera to determine the proper position of the film correctly, the manner of marking is crude and imperfect, and in use is unsatisfactory in several particulars, viz:—When a fresh roll of films has been placed in the camera, a good many turns of the winding key must be made before unwinding the covering ribbon sufficiently to bring the first section of film into proper position for exposure, and unless the user is careful, and unless he keeps his eye constantly fixed on the window of the camera and winds off the film slowly and especially if the light is dim, or too bright, causing a glare, he is in constant danger of inadvertently winding the film too far, causing loss of a section, or overlapping of images which causes a double loss, and the undue care thus required is duplicated at each succeeding movement of the film, constituting a distinct disadvantage. It is true that by winding off the exposed film quite slowly and by constantly watching the window for the small marks on the back of the covering ribbon the danger of loss of film can be avoided in most cases, but it often happens that the user of the camera needs to wind off the exposed section and get a new section into position for exposure, in minimum time, or lose a good view. Again, if the user chances to look away from the camera window while winding, he may wind off fresh film a trifle beyond the proper position, and as soon as the indicating mark or number passes beyond the window, the user has no way of telling whether the desired position has been reached or passed, thus causing loss of film in either case. It is not expedient to depend on counting the number of turns of the winding key because the number of turns varies from first to last, and as cartridges having films of different length are used in the same camera and as the user may forget which length is in the camera, he may wind off film and take exposures as for a short length, then rapidly wind further in order to remove the cartridge, whereas it may have a number of lengths of unexposed film which are thus easily lost before the mistake is noticed. All of the above-mentioned loss, uncertainty and disadvantage and the need for slow winding and constant observation of the camera window are avoidable by use of my improved markings, which permit the films to be wound off at high speed with practically no danger of over-winding and loss of films, and with need of minimum observation of the camera window.

The roll of film shown in Fig. 1 consists essentially of the sensitive film A and the protective opaque ribbon B, on the front face of which the sensitive film A is mounted in the usual manner. The back of the protective ribbon B is provided with film-section or position marks C and with connecting marks D intermediate the said film-section or position marks C. The film-section or position marks C, as shown in Figs. 1, 2, 4, 5, 6, 7 and 8, are in the form of rings containing consecutive numerals to indicate the film section of the sensitive film A, as such sections are moved into position for exposure. The connecting or intermediate marks D are preferably in the form of two converging lines extending tangentially from the circle of one film-section or position mark C to the next film-section or position mark C with the apex of the converging lines terminating at the front of the following film-section or position mark. Leading to or pilot marks E precede the first film-section or position mark C, and the several marks E, C and D are so arranged relative to the observation window F of a camera G in which the roll film is used that the said marks appear or are visible through the said observation window F, as indicated in Figs. 2 and 3.

In using the camera, the roll film is unwound until the circle of a film-section or position mark C appears concentrically within the observation window F, as shown in Fig. 2.

In the modified form shown in Fig. 3, the film-section or position mark C' is in the form of two spaced lines, between which is arranged the corresponding numeral, and the lines are adapted to register with the marks F' on the observation window F² held on the camera G'. In this case the film is unwound until the spaced lines register with the marks F'.

In the modified form shown in Fig. 4, the connecting marks D' consist of an arrow extending from one film-section or position mark to the other with the head of the arrow at the following position mark.

In the modified form shown in Fig. 5, the connecting mark D² is in the form of an elongated diamond, and the connecting mark D³, shown in Fig. 6, is in the form of a wedge, while the connecting mark D⁴, shown in Fig. 7, is in the form of vertical lines arranged one alongside the other and diminishing in size from one film-section or position mark C to the next following one.

It is not absolutely necessary that the connecting marks D, D', D², D³ and D⁴ reach from one film-section or position mark C to the next following one, as such connecting mark may be arranged immediately preceding a film-section or position mark, as indicated in Fig. 8.

In beginning to unwind a freshly inserted roll, the unwinding may be begun with all possible speed and may be so continued until close to the first film-section or position mark C, by which time the tapering of the long indicating angle of the leading to mark E will indicate to the operator the need of slowing down for the last portion or two, that is, until the numeral "1" of the first film-section or position mark appears in the camera window F. When this section of the film has been exposed the film can be wound up very rapidly with practically no danger of overwinding, for the reason that the operator knows at each instant when approaching the exact position for the following exposure. If the user's camera has been idle for a long time and the user has forgotten whether the camera contains a six-film or a ten-film roll, then the user by the improved indicating means can readily ascertain when the last film section has been reached. In the case of a six-film roll a blank space follows the last film-section or position mark C, and in case a ten-film roll is in the camera and the film-section or position mark 6 has passed the observation window F, then the user by seeing the next connecting mark D immediately knows that some film sections are coming. If while unwinding the film the user's attention is drawn away momentarily it does not matter, as by observing the camera window the user can see the exact position owing to the graduated shape given to the connecting marks D.

Although I have shown and described various forms of the film-section or position marks and the connecting marks, I do not limit myself to the same, as such marks may be varied without deviating from the spirit of my invention.

Having thus described my invention, I claim as new and desire to secure by Letters Patent:

1. A roll film having an opaque protective ribbon provided at the back with film section marks spaced apart, and marks between the said film section marks and graduated to indicate the approach of the succeeding film section mark.

2. A roll film having an opaque protective ribbon provided at the back with film section marks spaced apart, and connecting marks intermediate the said film section marks, and graduated from one film section mark to the other to indicate the approach of a film section mark at the observation window of a camera when unwinding the roll film for moving an unexposed film section into exposing position.

3. A roll film having an opaque protective ribbon provided at the back with film section marks spaced apart, and connecting marks intermediate the said film section marks, and formed by lines converging from one film section mark to the next following one.

4. A roll film having an opaque protective ribbon provided at the back with film section marks spaced apart, and connecting marks intermediate the said film section marks, the said film section marks being in the form of circles inclosing consecutive numerals, and the said connecting marks being formed by converging lines extending tangentially from one circle and having the apex terminating at the front of the next following circle.

5. A roll film having an opaque protective ribbon provided at the back with film section marks spaced apart, connecting marks intermediate the said film section marks and graduated to indicate the approach of the succeeding film section mark, and a leading to mark preceding the first film section mark.

In testimony whereof I have signed my name to this specification in the presence of two subscribing witnesses.

HORACE M. ENGLE.

Witnesses:
THEO. G. HOSTER,
PHILIP D. ROLLHAUS.